(12) United States Patent
Furuta et al.

(10) Patent No.: US 9,577,492 B2
(45) Date of Patent: Feb. 21, 2017

(54) MARINE PROPULSION DEVICE AND BOAT

(71) Applicant: YAMAHA HATSUDOKI KABUSHIKI KAISHA, Shizuoka-ken (JP)

(72) Inventors: Hideki Furuta, Shizuoka-ken (JP); Jun Noguchi, Shizuoka-ken (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 0 days.

(21) Appl. No.: 14/973,434

(22) Filed: Dec. 17, 2015

(65) Prior Publication Data

US 2016/0218591 A1   Jul. 28, 2016

(30) Foreign Application Priority Data

Jan. 28, 2015   (JP) .................................. 2015-013912

(51) Int. Cl.
| | | |
|---|---|---|
| B63H 20/14 | (2006.01) | |
| H02K 7/18 | (2006.01) | |
| B63H 20/32 | (2006.01) | |
| F02B 63/04 | (2006.01) | |
| H02K 11/04 | (2016.01) | |
| H02K 3/28 | (2006.01) | |
| H02K 3/12 | (2006.01) | |
| H02K 19/34 | (2006.01) | |
| H02K 21/48 | (2006.01) | |

(52) U.S. Cl.
CPC ............ H02K 7/1815 (2013.01); B63H 20/14 (2013.01); B63H 20/32 (2013.01); F02B 63/042 (2013.01); H02K 3/12 (2013.01); H02K 3/28 (2013.01); H02K 11/046 (2013.01); H02K 19/34 (2013.01); H02K 21/48 (2013.01)

(58) Field of Classification Search
CPC ......... B63H 20/00; B63H 20/14; B63H 20/28; B63H 20/32; B63H 21/20; H02K 3/12; H02K 3/28; H02K 5/24; H02K 7/1815; H02K 11/046
USPC ...................................... 440/3, 6, 83; 290/31
See application file for complete search history.

(56) References Cited

U.S. PATENT DOCUMENTS

| | | | |
|---|---|---|---|
| 2004/0036295 A1* | 2/2004 | Nakagawa | ............... F02N 11/04 290/31 |
| 2004/0192123 A1* | 9/2004 | Mori | ...................... B63H 20/00 440/6 |
| 2008/0315583 A1* | 12/2008 | Beck | ...................... B63H 21/20 290/31 |

FOREIGN PATENT DOCUMENTS

| | | |
|---|---|---|
| JP | 09-039895 A | 2/1997 |
| JP | 2002-127990 A | 5/2002 |

* cited by examiner

*Primary Examiner* — Lars A Olson
(74) *Attorney, Agent, or Firm* — Rabin & Berdo, P.C.

(57) ABSTRACT

A marine propulsion device, including an engine including a crankshaft, and a power generator including a rotor configured to be rotated by the crankshaft, and a stator arranged to face the rotor, the stator including a first coil group and a second coil group each configured to generate alternating current (AC), the second coil group being configured to generate more electric power than the first coil group. The marine propulsion device further includes a rectifier configured to rectify the AC generated by the first coil group to thereby obtain a first direct current (DC), and to output the first DC to a first battery, a converting device configured to convert the AC generated by the second coil group into a second DC, and a transformation device configured to transform a voltage of the second DC, and to output the voltage-transformed DC to a second battery.

16 Claims, 6 Drawing Sheets

OUTPUT POWER AND OUTPUT CURRENT OF
FIRST COIL GROUP AND SECOND COIL GROUP

| NUMBER OF ROTATIONS | FIRST COIL GROUP | | SECOND COIL GROUP | |
|---|---|---|---|---|
| | CURRENT | ELECTRIC POWER | CURRENT | ELECTRIC POWER |
| 600 rpm | 18.3 A | 266 W | 36.7 A | 532 W |
| 1000 rpm | 30.7 A | 445 W | 66.7 A | 967 W |
| 3000 rpm | 33.2 A | 432 W | 100 A | 1450 W |
| 6000 rpm | 33.2 A | 432 W | 100 A | 1450 W |

FIRST MODIFICATION

SECOND MODIFICATION

MARINE PROPULSION DEVICE AND BOAT

CROSS-REFERENCE TO RELATED APPLICATION

The priority application number JP2015-013912, entitled "Marine Propulsion Device and Boat," and filed Jan. 28, 2015, by Hideki Furuta and Jun Noguchi, upon which this patent application is based, is hereby incorporated by reference in its entirety.

BACKGROUND OF THE INVENTION

Field of the Invention

The present invention relates to a marine propulsion device and a boat.

Description of the Background Art

A marine propulsion device is known in general. Such a marine propulsion device is disclosed in Japanese Patent Laying-Open No. 2002-127990, for example.

The aforementioned Japanese Patent Laying-Open No. 2002-127990 discloses a boat propulsion device (marine propulsion device) that includes a power generator including a first coil group and a second coil group, a first rectifier regulator configured to convert electric power generated by the first coil group into direct-current power and to output the direct-current power to a first battery, and a second rectifier regulator configured to convert electric power generated by the second coil group into direct-current power and to output the direct-current power to a second battery.

In the conventional marine propulsion device described in the aforementioned Japanese Patent Laying-Open No. 2002-127990, the first rectifier regulator and the second rectifier regulator rectify and output the electric power generated by the first coil group and the second coil group, respectively. Thus, the output of the power generator is determined by the number of rotations of an engine, and hence it is necessary to increase the size of the power generator in order to stably supply bulk electric power in the case where the capacity of the second battery is increased, for example. Therefore, a marine propulsion device and a boat each enabling an increase in the amount of electric power supply while significantly reducing or preventing an increase in the size of a power generator are desired.

SUMMARY OF THE INVENTION

The present invention has been proposed in order to solve the aforementioned problem, and to provide a marine propulsion device and a boat each enabling an increase in the amount of electric power supply while significantly reducing or preventing an increase in the size of a power generator.

A marine propulsion device according to a first aspect of the present invention includes an engine including a crankshaft, a power generator including a rotor rotated following rotation of the crankshaft and a stator arranged to face the rotor, the stator on which a first coil group and a second coil group configured to output more electric power than electric power output from the first coil group are wound, a rectifier configured to rectify alternating-current power generated in the first coil group and to output the rectified alternating-current power to a first battery, a converting device including a switching element, configured to convert alternating-current power generated in the second coil group into direct-current power, and a transformation mechanism configured to transform the voltage of the direct-current power into which the converting device converts the alternating-current power and to output the direct-current power, the voltage of which is transformed, to a second battery.

As hereinabove described, the marine propulsion device according to the first aspect is provided with the converting device including the switching element, configured to convert the alternating-current power generated in the second coil group into the direct-current power and the transformation mechanism configured to transform the voltage of the direct-current power into which the converting device converts the alternating-current power and to output the direct-current power, the voltage of which is transformed, to the second battery, whereby the output of the second coil group of the power generator can be controlled by the converting device including the switching element, and the output voltage of the power generator can be increased by the transformation mechanism. Therefore, bulk electric power can be stably supplied to the second battery by increasing the output of the second coil group of the power generator regardless of the number of rotations of the engine. Thus, the amount of electric power supply can be increased while an increase in the size of the power generator is significantly reduced or prevented.

In the aforementioned marine propulsion device according to the first aspect, the windings of the second coil group preferably have cross-sectional areas equal to or greater than the cross-sectional areas of the windings of the first coil group. According to this structure, the electric resistance of the second coil group can be smaller than the electric resistance of the first coil group, and hence a current flowing in the second coil group can be increased when the induced voltages of the first coil group and the second coil group are the same. Consequently, the electric power output from the second coil group can be easily more than the electric power output from the first coil group.

In this case, the number of winds per slot of the second coil group is preferably not more than the number of winds per slot of the first coil group. According to this structure, even if the cross-sectional areas of the windings of the second coil group are increased, an excessive increase in the thicknesses of the slots of the second coil group on which the windings are wound relative to the thicknesses of the slots of the first coil group on which the windings are wound can be significantly reduced or prevented.

In the aforementioned structure in which the windings of the second coil group have the cross-sectional areas equal to or greater than the cross-sectional areas of the windings of the first coil group, the stator preferably includes stacked magnetic steel sheets, and the stack thickness of the stator on which the second coil group is wound is preferably not more than the stack thickness of the stator on which the first coil group is wound. According to this structure, even if the cross-sectional areas of the windings of the second coil group 125 are increased, an excessive increase in the thicknesses of the slots of the second coil group on which the windings are wound relative to the thicknesses of the slots of the first coil group on which the windings are wound can be significantly reduced or prevented.

In the aforementioned marine propulsion device according to the first aspect, the windings of the first coil group are preferably wound on a plurality of slots, the windings of the second coil group are preferably wound on a plurality of slots different from the slots on which the windings of the first coil group are wound, and the number of slots on which the windings of the second coil group are wound is preferably equal to or more than the number of slots on which the windings of the first coil group are wound. According to this structure, the generated electric power output from the second coil group can be easily more than the generated electric power output from the first coil group.

In the aforementioned marine propulsion device according to the first aspect, the windings of the first coil group and the windings of the second coil group are preferably wound on common slots. According to this structure, an output from the windings of the first coil group wound on the slots in common with the slots of the windings of the second coil group controlled by the converting device including the switching element can also be increased regardless of the number of rotations of the engine.

In the aforementioned marine propulsion device according to the first aspect, the output electric power of the second coil group is preferably equal to or more than twice the output electric power of the first coil group. According to this structure, more electric power can be supplied from the second coil group to the second battery even when the power consumption of a device connected to the second battery is increased.

In the aforementioned marine propulsion device according to the first aspect, the output electric power of the second coil group when the engine idles is preferably equal to or more than the output electric power of the first coil group when the engine operates at full throttle. According to this structure, bulk electric power can be stably supplied to the second battery by increasing the electric power output from the second coil group even during the idling in which the number of rotations of the engine is small.

In the aforementioned marine propulsion device according to the first aspect, the rotor, the stator, the rectifier, the converting device, and the transformation mechanism are preferably arranged internally in a cowling that covers the engine. According to this structure, the rotor, the stator, the rectifier, the converting device, and the transformation mechanism are arranged internally in the cowling that covers the engine, whereby the components of the marine propulsion device can be compactly arranged.

In this case, at least one of the rectifier, the converting device, and the transformation mechanism is preferably fixed to the engine. According to this structure, the rectifier, the converting device, or the transformation mechanism can be arranged close to the engine (power generator), and hence an increase in a transmission distance of electric power can be significantly reduced or prevented.

In the aforementioned structure in which the rotor, the stator, the rectifier, the converting device, and the transformation mechanism are arranged internally in the cowling that covers the engine, the rotor is preferably provided integrally with a flywheel connected to the crankshaft. According to this structure, the number of components can be reduced as compared with the case where the rotor and the flywheel are provided separately from each other.

In this case, the rotor is preferably arranged above or below the engine on the axis of the crankshaft. According to this structure, in the engine of the marine propulsion device including the crankshaft that vertically extends, the rotation of the crankshaft can be efficiently transmitted to the rotor of the power generator.

A boat according to a second aspect of the present invention includes a marine propulsion device, a boat body mounted with the marine propulsion device, and a first battery and a second battery both arranged in the boat body. The marine propulsion device includes an engine including a crankshaft, a power generator including a rotor rotated following rotation of the crankshaft and a stator arranged to face the rotor, the stator on which a first coil group and a second coil group configured to output more electric power than electric power output from the first coil group are wound, a rectifier configured to rectify alternating-current power generated in the first coil group and to output the rectified alternating-current power to the first battery, a converting device including a switching element, configured to convert alternating-current power generated in the second coil group into direct-current power, and a transformation mechanism configured to transform the voltage of the direct-current power into which the converting device converts the alternating-current power and to output the direct-current power, the voltage of which is transformed, to the second battery.

As hereinabove described, the boat according to the second aspect is provided with the converting device including the switching element, configured to convert the alternating-current power generated in the second coil group into the direct-current power and the transformation mechanism configured to transform the voltage of the direct-current power into which the converting device converts the alternating-current power and to output the direct-current power, the voltage of which is transformed, to the second battery, whereby the output of the second coil group of the power generator can be controlled by the converting device including the switching element, and the output voltage of the power generator can be increased by the transformation mechanism. Therefore, bulk electric power can be stably supplied to the second battery by increasing the output of the second coil group of the power generator regardless of the number of rotations of the engine. Thus, the boat enabling an increase in the amount of electric power supply while significantly reducing or preventing an increase in the size of the power generator can be provided.

In the aforementioned boat according to the second aspect, the first battery is preferably configured to supply electric power to an engine accessory configured to drive the engine of the marine propulsion device, and the second battery is preferably configured to supply electric power to an electrical component arranged in the boat body. According to this structure, bulk electric power is supplied to the second battery even when the power consumption of the electrical component of the boat body is increased, and hence an electric power shortage in the electrical component can be significantly reduced or prevented.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

(Structure of Boat)

The structure of a boat 100 according to the embodiment of the present invention is now described with reference to FIGS. 1 and 2. In the figure, arrow FWD represents the forward movement direction of the boat 100, and arrow BWD represents the reverse movement direction of the boat 100. Furthermore, in the figure, arrow R represents the starboard direction of the boat 100, and arrow L represents the portside direction of the boat 100.

Figure 1:
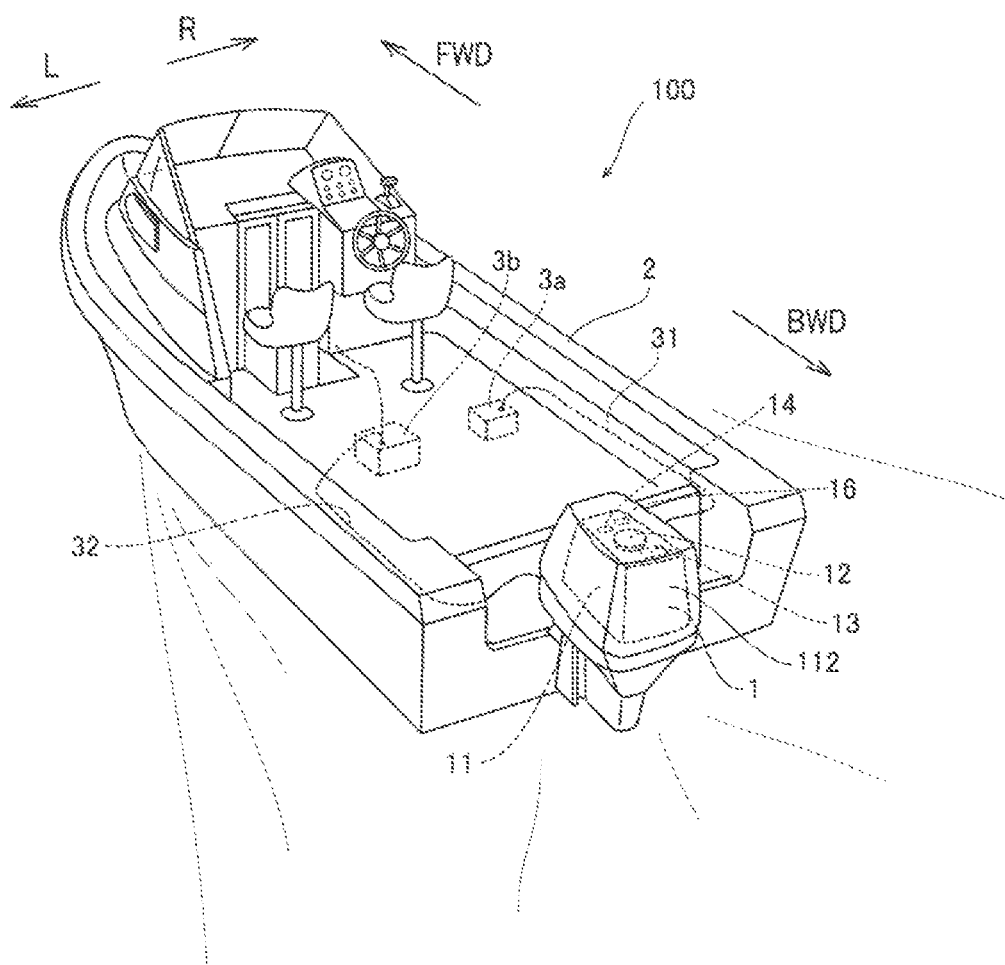
FIG. 1 is a perspective view showing a boat according to an embodiment of the present invention.

The boat 100 includes an outboard motor 1, a boat body 2, an engine battery 3a, and a boat accessory battery 3b, as shown in FIG. 1. One outboard motor 1 is provided on a rear portion of the boat body 2. The engine battery 3a is connected to the outboard motor 1 through a cable 31. The boat accessory battery 3b is connected to the outboard motor 1 through a cable 32. The outboard motor 1 is an example of the "marine propulsion device" in the present invention. The engine battery 3a and the boat accessory battery 3b are examples of the "first battery" and the "second battery" in the present invention, respectively.

(Description of Outboard Motor)

Figure 2:
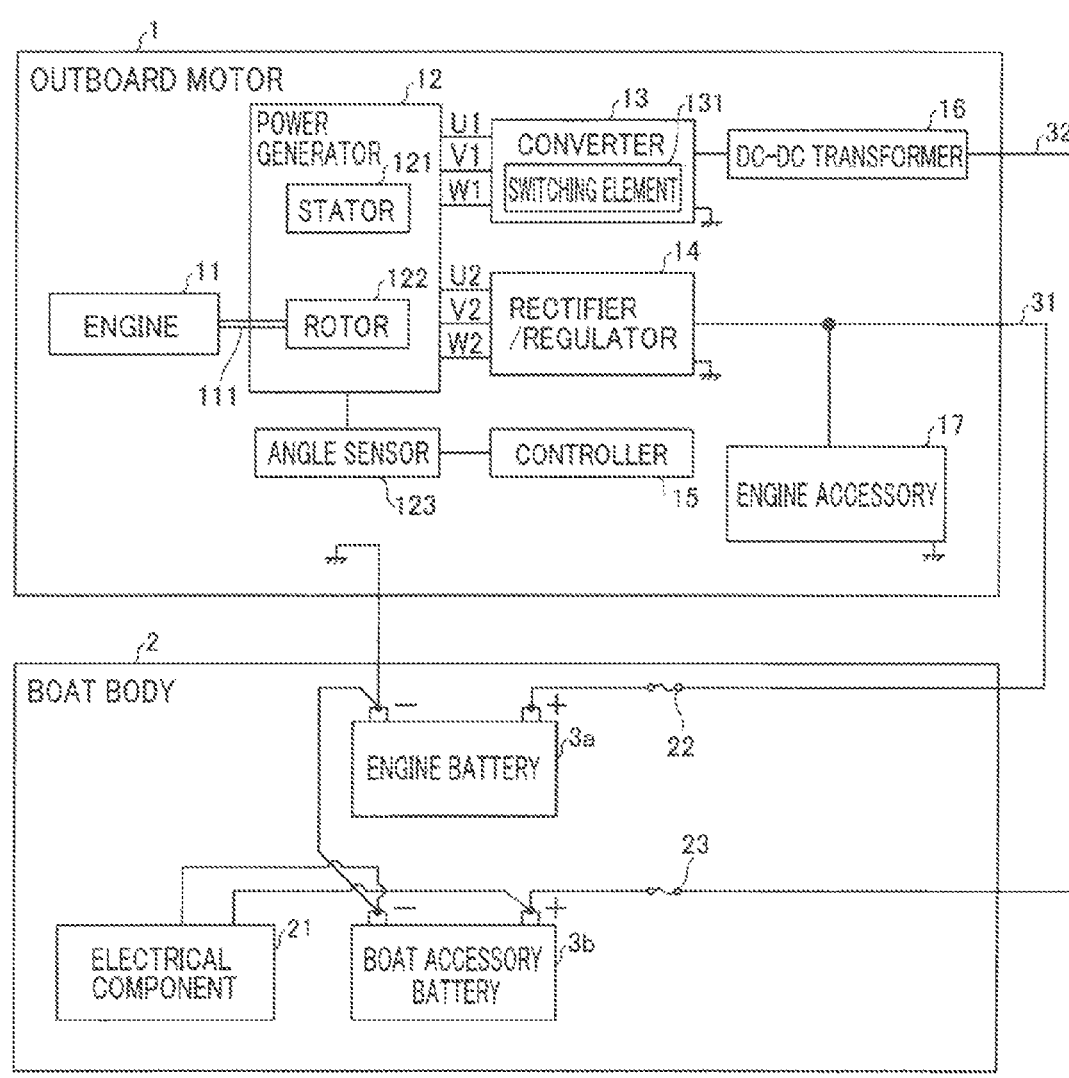
FIG. 2 is a block diagram schematically showing the boat according to the embodiment of the present invention.
Figure 3:
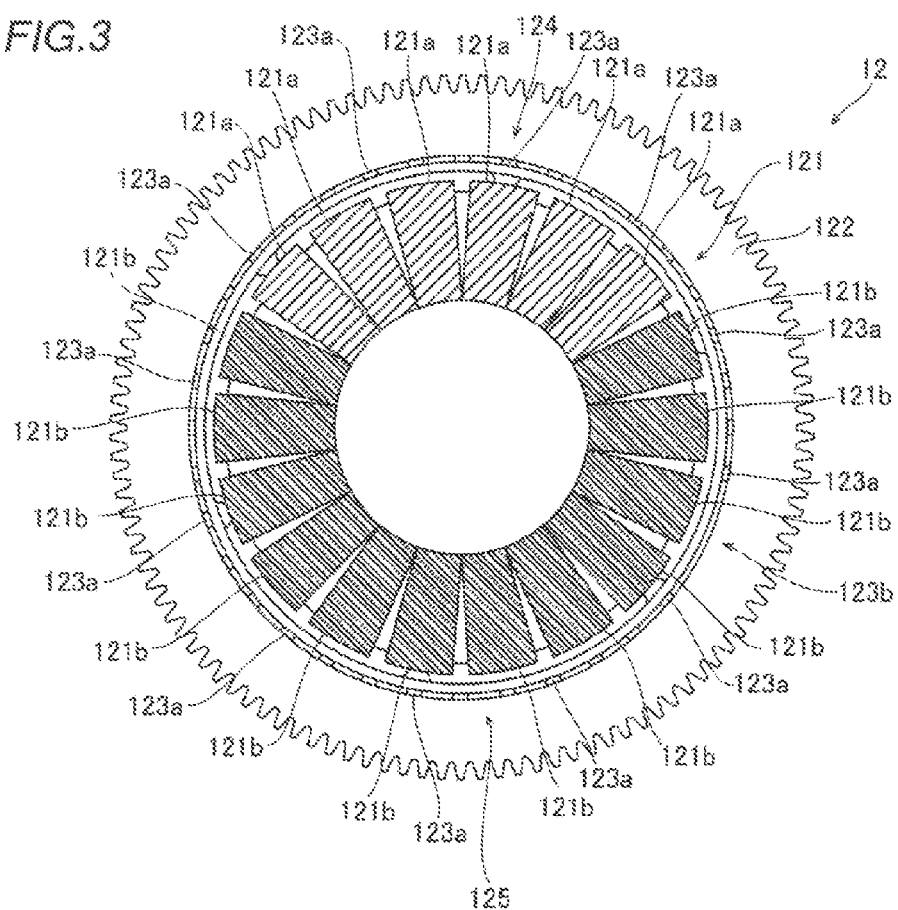
FIG. 3 illustrates arrangements of coil groups of a power generator of the boat according to the embodiment of the present invention.

The outboard motor 1 includes an engine 11, a power generator 12, a converter 13, a rectifier/regulator 14, a controller 15, a DC(direct current)-DC transformer 16, and an engine accessory 17, as shown in FIG. 2. The engine 11 includes a crankshaft 111 and a cowling 112 (see FIG. 1). The power generator 12 includes a stator 121 and a rotor 122. The power generator 12 is provided with an angle sensor 123. The converter 13 includes a plurality of switching elements 131. As shown in FIG. 3, in the rotor 122 of the power generator 12, the windings of a first coil group 124 are wound on a plurality of slots 121a. Furthermore, in the rotor 122 of the power generator 12, the windings of a second coil group 125 are wound on a plurality of slots 121b. The converter 13 is an example of the "converting device" in the present invention, and the rectifier/regulator 14 is an example of the "rectifier" in the present invention. The DC-DC transformer 16 is an example of the "transformation mechanism" or "transformation device" in the present invention.

As shown in FIG. 1, the power generator 12 (the rotor 122 and the stator 121), the rectifier/regulator 14, the converter 13, and the DC-DC transformer 16 are arranged internally in the cowling 112 that covers the engine 11. The power generator 12 (the rotor 122 and the stator 121) is arranged above the engine 11 on the axis of the crankshaft 111. The rectifier/regulator 14, the converter 13, and the DC-DC transformer 16 are fixed to the engine 11.

The outboard motor 1 is arranged to extend to below the engine 11 and further includes a drive shaft configured to transmit the drive force of the engine 11, one propeller shaft that extends in a direction orthogonal to (intersecting with) the drive shaft, and one propeller mounted on a rear end portion of the propeller shaft, rotated together with the propeller shaft.

The boat body 2 is provided with an electrical component 21 and fuses 22 and 23, as shown in FIG. 2.

The engine 11 rotates the crankshaft 111 to rotate the propeller of the outboard motor 1. The rotation of the propeller generates propulsion power, and the boat body 2 moves. The engine 11 rotates the crankshaft 111 to rotate the rotor 122 of the power generator 12. The rotation of the rotor 122 generates electromotive force, and the power generator 12 generates electric power. The engine 11 is powered by fuel such as gasoline or gas oil.

The power generator 12 is arranged on an upper portion of the engine 11, as shown in FIG. 1. The rotor 122 of the power generator 12 is driven by the crankshaft 111 and rotates with respect to the stator 121. As shown in FIG. 2, the power generator 12 generates two sets of alternating-current power of three phases (a U1 phase, a V1 phase, and a W1 phase and a U2 phase, a V2 phase, and a W2 phase) by the rotation of the rotor 122. A first set of the generated alternating-current power of three phases (the U1 phase, the V1 phase, and the W1 phase) is output to the converter 13. A second set of the generated alternating-current power of three phases (the U2 phase, the V2 phase, and the W2 phase) is output to the rectifier/regulator 14.

The stator 121 is arranged to face the rotor 122, as shown in FIG. 3. The first coil group 124 and the second coil group 125 are wound on the stator 121. The stator 121 is formed by stacking magnetic steel sheets. The stator 121 includes six slots 121a on which the windings of the first coil group 124 are wound and twelve slots 121b on which the windings of the second coil group 125 are wound. In other words, the windings of the first coil group 124 and the windings of the second coil group 125 are wound on slots different from each other.

According to this embodiment, electric power output from the second coil group 125 is more than electric power output from the first coil group 124. The first coil group 124 is connected to the rectifier/regulator 14. The second coil group 125 is connected to the converter 13. In other words, the alternating-current power of the three phases (the U2 phase, the V2 phase, and the W2 phase) output from the first coil group 124 is rectified by the rectifier/regulator 14 and is output to the engine battery 3a. The alternating-current power of the three phases (the U1 phase, the V1 phase, and the W1 phase) output from the second coil group 125 is converted into direct-current power by the converter 13, the voltage of the direct-current power is transformed by the DC-DC transformer 16, and the direct-current power, the voltage of which is transformed, is output to the boat accessory battery 3b.

The windings of the second coil group 125 have cross-sectional areas equal to or greater than the cross-sectional areas of the windings of the first coil group 124. The windings of the first coil group 124 include round wires (cross-sectional areas of about 2.0 mm$^2$) of which the diameters are 1.6 mm, for example. The windings of the second coil group 125 include rectangular wires (cross-sectional areas of about 3.0 mm$^2$) of 1×3 mm, for example. The number of winds per slot 121b of the second coil group 125 is not more than the number of winds per slot 121a of the first coil group 124.

Figure 4:
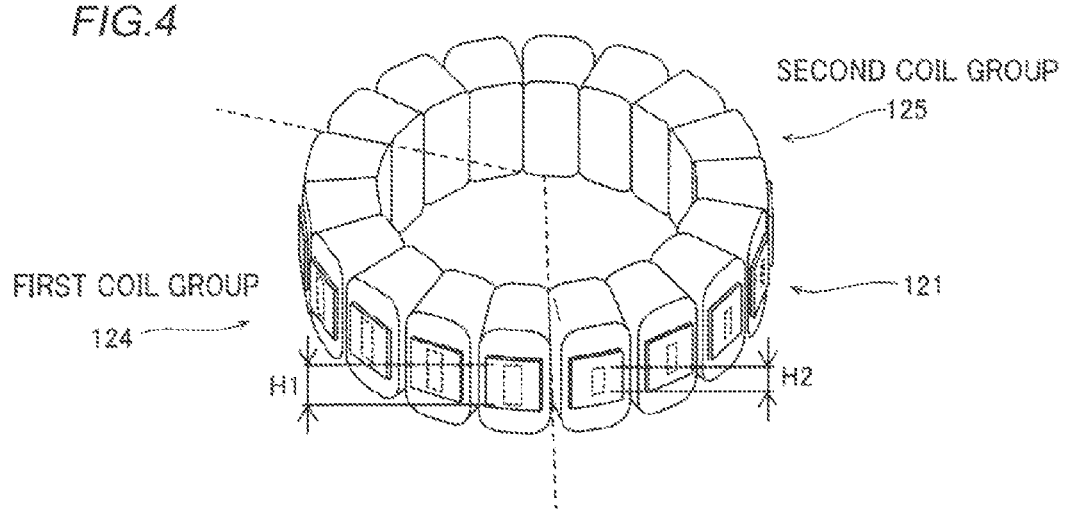
FIG. 4 is an upper perspective view showing a stator of the power generator of the boat according to the embodiment of the present invention.

As shown in FIG. 4, the stack thickness H2 of the stator 121 on which the second coil group 125 is wound is not more than the stack thickness H1 of the stator 121 on which the first coil group 124 is wound. Thus, the thickness of the stator 121 including the windings of the first coil group 124 is substantially equal to the thickness of the stator 121 including the windings of the second coil group 125.

Figure 5:
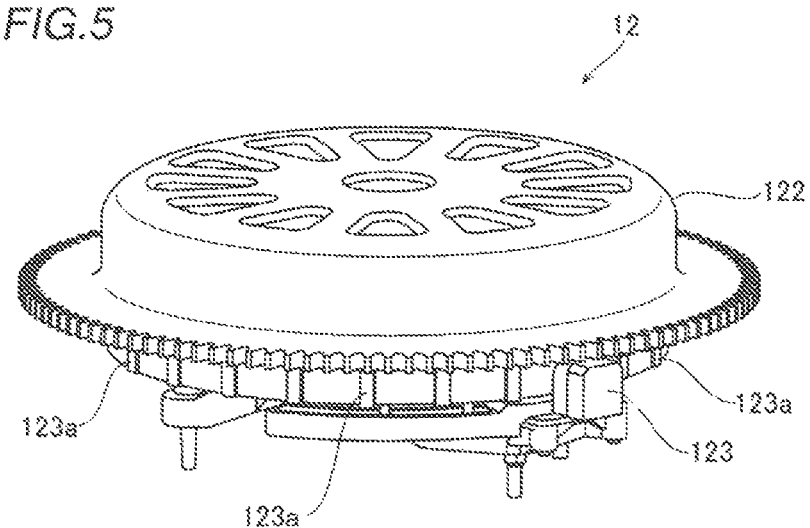
FIG. 5 is an upper perspective view showing the power generator of the boat according to the embodiment of the present invention.
Figure 6:
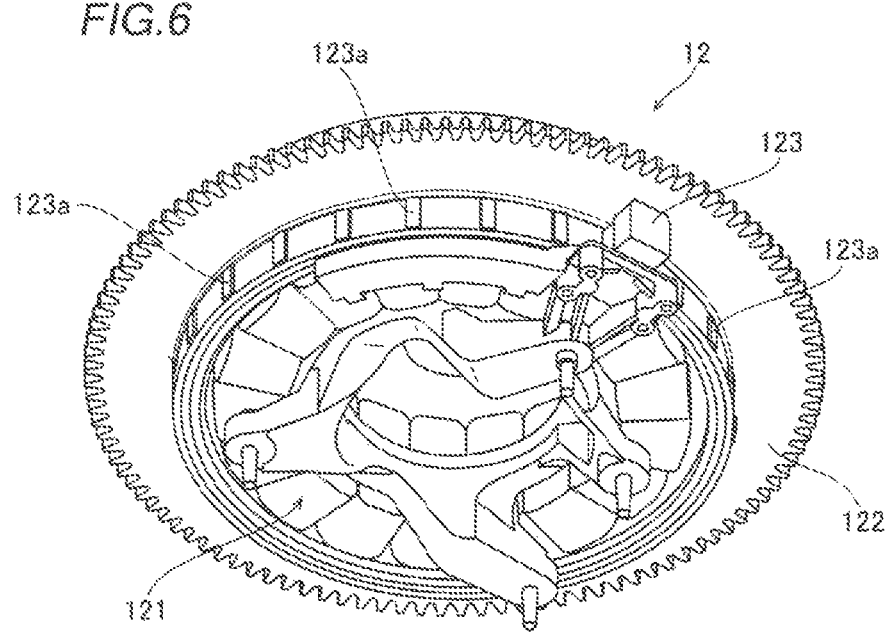
FIG. 6 is a lower perspective view showing the power generator of the boat according to the embodiment of the present invention.

As shown in FIGS. 3, 5, and 6, the rotor 122 is arranged external to the stator 121 to surround the stator 121. The rotor 122 includes permanent magnets. The rotor 122 is connected to the crankshaft 111 and also serves as a flywheel of the crankshaft 111. In other words, the rotor 122 is provided integrally with the flywheel. The rotor 122 is provided with a gear. The gear of the rotor 122 engages with a gear of a starter motor when the engine 11 is started. In other words, the starter motor is driven when the engine 11 is started, whereby the rotor 122 rotates the crankshaft 111.

As shown in FIGS. 2, 5, and 6, the angle sensor 123 detects the number of rotations (rotational speed) of the rotor 122. Specifically, the outer periphery of the rotor 122 is provided with a plurality of detection protrusions 123a, as shown in FIG. 3. Thirty-four detection protrusions 123a are provided at 10 degree intervals. In other words, the rotor 122 has a missing portion 123b corresponding to two detection protrusions 123a instead of providing the two detection protrusions 123a. The angle sensor 123 detects each of the detection protrusions 123a. The angle sensor 123 detects each of the detection protrusions 123a, using the missing portion 123b as a reference position. The angle sensor 123 detects the plurality of detection protrusions 123a and the missing portion 123b that move with respect to the angle sensor 123 following the rotation of the rotor 122 and detects the number of rotations (rotational speed) of the rotor 122. The detected number of rotations (rotational speed) is transmitted to the controller 15.

Figures 7, 8:
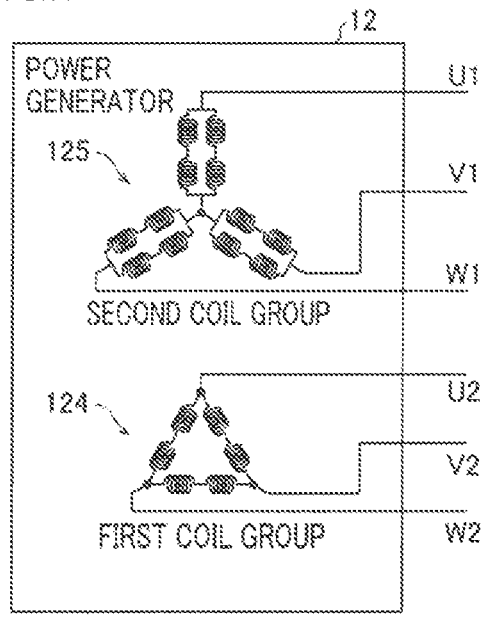
FIG. 7 illustrates connection of the windings of the power generator of the boat according to the embodiment of the present invention.
FIG. 8 is a table showing an example of the output electric power of the power generator of the boat according to the embodiment of the present invention.

As shown in FIG. 7, the first coil group 124 is connected by delta connection. Specifically, the windings of the six slots 121a of the first coil group 124 are coupled in series two by two, and the three series coupled windings are connected by the delta connection. The second coil group 125 is connected by star connection (Y-connection). Specifically, the windings of the twelve slots 121b of the second coil group 125 are coupled in series two by two, the six series coupled windings are coupled in parallel two by two, and the three parallel coupled windings are connected by the star connection. In other words, the connection of the first coil group 124 and the connection of the second coil group 125 are different from each other. The second coil group 125 is connected by the star connection to be capable of outputting electric power of a high voltage.

According to this embodiment, the converter 13 converts the alternating-current power output from the second coil group 125 of the power generator 12 into the direct-current power. Specifically, the alternating-current power of the three phases is converted into the direct-current power by switching of the plurality of switching elements 131 of the converter 13. The direct-current power into which the converter 13 converts the alternating-current power is output to the DC-DC transformer 16. The converter 13 performs field control of the power generator 12 such that the output of the second coil group 125 of the power generator 12 is increased. Specifically, the converter 13 accelerates or delays the timing (phase) of the switching to perform the field control of the power generator 12. In other words, the converter 13 performs control such that the output electric power of the second coil group 125 is increased even when the number of rotations of the engine 11 (power generator 12) is small. The rectifier/regulator 14 rectifies the alternating-current power output from the first coil group 124 of the power generator 12 and converts the rectified alternating-current power into direct-current power. Specifically, the rectifier/regulator 14 includes a plurality of diodes. The alternating-current power is converted into the direct-current power by rectification of the plurality of diodes. The rectifier/regulator 14 steps down the voltage of the electric power output from the power generator 12 to the working voltage of the engine accessory 17 (the charging voltage of the engine battery 3a). The direct-current power obtained by conversion of the alternating-current power by the rectifier/regulator 14, the voltage of which is stepped down by the rectifier/regulator 14, is supplied to the engine accessory 17 and the engine battery 3a.

The controller 15 controls the outboard motor 1. Specifically, the controller 15 controls power conversion of the converter 13 and controls transformation of the DC-DC transformer 16. The controller 15 includes a CPU (central processing unit). The controller 15 controls the converter 13 and the DC-DC transformer 16 on the basis of the number of rotations of the power generator 12 detected by the angle sensor 123 and the voltage and current of the direct-current power output from the DC-DC transformer 16.

The DC-DC transformer 16 steps down the voltage of the direct-current power output from the converter 13 and outputs the direct-current power, the voltage of which is stepped down. Specifically, the DC-DC transformer 16 steps down the voltage of the converter 13 to the charging voltage of the boat accessory battery 3b. In other words, the potential of the converter 13 (the second coil group 125 of the power generator 12) is increased as viewed from the perspective of the boat accessory battery 3b. The direct-current power output from the DC-DC transformer 16 is supplied to the boat accessory battery 3b.

The engine accessory 17 includes devices configured to drive the engine 11, such as the starter motor, an injector, an engine control unit (ECU), and a spark plug. Electric power is supplied from the engine battery 3a and the first coil group 124 of the power generator 12 to the engine accessory 17, whereby the engine accessory 17 is driven.

The electrical component 21 includes devices such as an air conditioning of a cabin, a refrigerator, a water heater, an audio instrument, and an electric light. Electric power is supplied from the boat accessory battery 3b to the electrical component 21. The power capacity of the boat accessory battery 3b is larger than that of the engine battery 3a. In other words, the power consumption of the electrical component 21 is larger than that of the engine accessory 17.

The fuses 22 and 23 are disconnected so that no current flows therethrough when a current exceeding the rating flows. The fuse 22 is arranged between the rectifier/regulator 14 and the engine battery 3a. The fuse 23 is arranged between the DC-DC transformer 16 and the boat accessory battery 3b.

The engine battery 3a is capable of supplying electric power to the engine accessory 17 through the cable 31. The battery voltage of the engine battery 3a is about 12 V, for example. The battery voltage of the boat accessory battery 3b is about 12 V, for example.

(Description of Output Electric Power)

The output electric power of the first coil group and the second coil group of the power generator is now described with reference to FIG. 8.

As in an example shown in FIG. 8, the electric power output by the second coil group 125 is more than the electric power output by the first coil group 124. Specifically, when the number of rotations of the engine 11 (power generator 12) is 600 rpm, the output current and the output electric power of the first coil group 124 are 18. 3 A and 266 W, respectively, while the output current and the output electric power of the second coil group 125 are 36.7 A and 532 W, respectively. When the number of rotations of the engine 11 (power generator 12) is 1000 rpm, the output current and the output electric power of the first coil group 124 are 30.7 A and 445 W, respectively, while the output current and the output electric power of the second coil group 125 are 66.7 A and 967 W, respectively. When the number of rotations of the engine 11 (power generator 12) is 3000 rpm, the output current and the output electric power of the first coil group 124 are 33.2 A and 432 W, respectively, while the output current and the output electric power of the second coil group 125 are 100 A and 1450 W, respectively. When the number of rotations of the engine 11 (power generator 12) is 6000 rpm, the output current and the output electric power of the first coil group 124 are 33.2 A and 432 W, respectively, while the output current and the output electric power of the second coil group 125 are 100 A and 1450 W, respectively.

In other words, when the first coil group 124 and the second coil group 125 of the power generator 12 generate electric power concurrently (the number of rotations of the engine 11 (power generator 12) is the same), the output electric power of the second coil group 125 is equal to or more than twice the output electric power of the first coil group 124. The output electric power of the second coil group 125 when the engine 11 idles (the number of rotations is 600 rpm, for example) is equal to or more than the output electric power of the first coil group 124 when the engine 11 operates at full throttle (the number of rotations is 6000 rpm, for example).

Effects of First Embodiment

According to this embodiment, the following effects are obtained.

According to this embodiment, as hereinabove described, the outboard motor 1 is provided with the converter 13 including the switching elements 131, configured to convert the alternating-current power generated in the second coil group 125 into the direct-current power and the DC-DC transformer 16 configured to transform the voltage of the direct-current power into which the converter 13 converts the alternating-current power and to output the direct-current power, the voltage of which is transformed, to the boat accessory battery 3b, whereby the output of the second coil group 12 of the power generator 12 can be controlled by the converter 13 including the switching elements 131, and the output voltage of the power generator 12 can be increased by the DC-DC transformer 16. Therefore, bulk electric power can be stably supplied to the boat accessory battery 3b by increasing the output of the second coil group 125 of the power generator 12 regardless of the number of rotations of the engine 11. Thus, the amount of electric power supply can be increased while an increase in the size of the power generator 12 is significantly reduced or prevented. According to this embodiment, as hereinabove described, the windings of the second coil group 125 have the cross-sectional areas equal to or greater than the cross-sectional areas of the windings of the first coil group 124. Thus, the electric resistance of the second coil group 125 can be smaller than the electric resistance of the first coil group 124, and hence a current flowing in the second coil group 125 can be increased when the induced voltages of the first coil group 124 and the second coil group 125 are the same. Consequently, the electric power output from the second coil group 125 can be easily more than the electric power output from the first coil group 124.

According to this embodiment, as hereinabove described, the number of winds per slot 121b of the second coil group 125 is not more than the number of winds per slot 121a of the first coil group 124. Thus, even if the cross-sectional areas of the windings of the second coil group 125 are increased, an excessive increase in the thicknesses of the slots 121b of the second coil group 125 on which the windings are wound relative to the thicknesses of the slots 121a of the first coil group 124 on which the windings are wound can be significantly reduced or prevented.

According to this embodiment, as hereinabove described, the stack thickness of the stator 121 on which the second coil group 125 is wound is not more than the stack thickness of the stator 121 on which the first coil group 124 is wound. Thus, even if the cross-sectional areas of the windings of the second coil group 125 are increased, an excessive increase in the thicknesses of the slots 121b of the second coil group 125 on which the windings are wound relative to the thicknesses of the slots 121a of the first coil group 124 on which the windings are wound can be significantly reduced or prevented.

According to this embodiment, as hereinabove described, the windings of the second coil group 125 are wound on the plurality of slots 121b different from the slots 121a on which the windings of the first coil group 124 are wound, and the number of slots on which the windings of the second coil group 125 are wound is equal to or more than the number of slots on which the windings of the first coil group 124 are wound. Thus, the generated electric power output from the second coil group 125 can be easily more than the generated electric power output from the first coil group 124.

According to this embodiment, as hereinabove described, the output electric power of the second coil group 125 is equal to or more than twice the output electric power of the first coil group 124. Thus, more electric power can be supplied from the second coil group 125 to the boat accessory battery 3b even when the power consumption of the electrical component 21 connected to the boat accessory battery 3b is increased.

According to this embodiment, as hereinabove described, the output electric power of the second coil group 125 when the engine 11 idles is equal to or more than the output electric power of the first coil group 124 when the engine 11 operates at full throttle. Thus, bulk electric power can be stably supplied to the boat accessory battery 3b by increasing the electric power output from the second coil group 125 even during the idling in which the number of rotations of the engine 11 is small.

According to this embodiment, as hereinabove described, the rotor 122, the stator 121, the rectifier/regulator 14, the converter 13, and the DC-DC transformer 16 are arranged internally in the cowling 112 that covers the engine 11. Thus, the rotor 122, the stator 121, the rectifier/regulator 14, the converter 13, and the DC-DC transformer 16 are arranged internally in the cowling 112 that covers the engine 11, whereby the components of the outboard motor 1 can be compactly arranged.

According to this embodiment, as hereinabove described, the rectifier/regulator 14, the converter 13, and the DC-DC transformer 16 are fixed to the engine 11. Thus, the rectifier/regulator 14, the converter 13, and the DC-DC transformer 16 can be arranged close to the engine 11 (power generator 12), and hence an increase in a transmission distance of electric power can be significantly reduced or prevented.

According to this embodiment, as hereinabove described, the rotor 122 is provided integrally with the flywheel connected to the crankshaft 111. Thus, the number of components can be reduced as compared with the case where the rotor 122 and the flywheel are provided separately from each other.

According to this embodiment, as hereinabove described, the rotor 122 is arranged above the engine 11 on the axis of the crankshaft 111. Thus, in the engine 11 of the outboard motor 1 including the crankshaft 111 that vertically extends, the rotation of the crankshaft 111 can be efficiently transmitted to the rotor 122 of the power generator 12.

According to this embodiment, as hereinabove described, the engine battery 3a is configured to supply electric power to the engine accessory 17 configured to drive the engine 11 of the outboard motor 1, and the boat accessory battery 3b is configured to supply electric power to the electrical component 21 arranged in the boat body 2. Thus, bulk electric power is supplied to the boat accessory battery 3b even when the power consumption of the electrical component 21 of the boat body 2 is increased, and hence an electric power shortage in the electrical component 21 can be significantly reduced or prevented.

Modification

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the marine propulsion device according to the present invention is applied to the outboard motor in the aforementioned embodiment, the present invention is not restricted to this. The marine propulsion device according to the present invention may alternatively be applied to a device other than the outboard motor. The marine propulsion device according to the present invention may be applied to a stern drive in which an engine is fixed to a boat body or an inboard motor in which an engine and a propeller are fixed to the boat body, for example.

Figure 9:
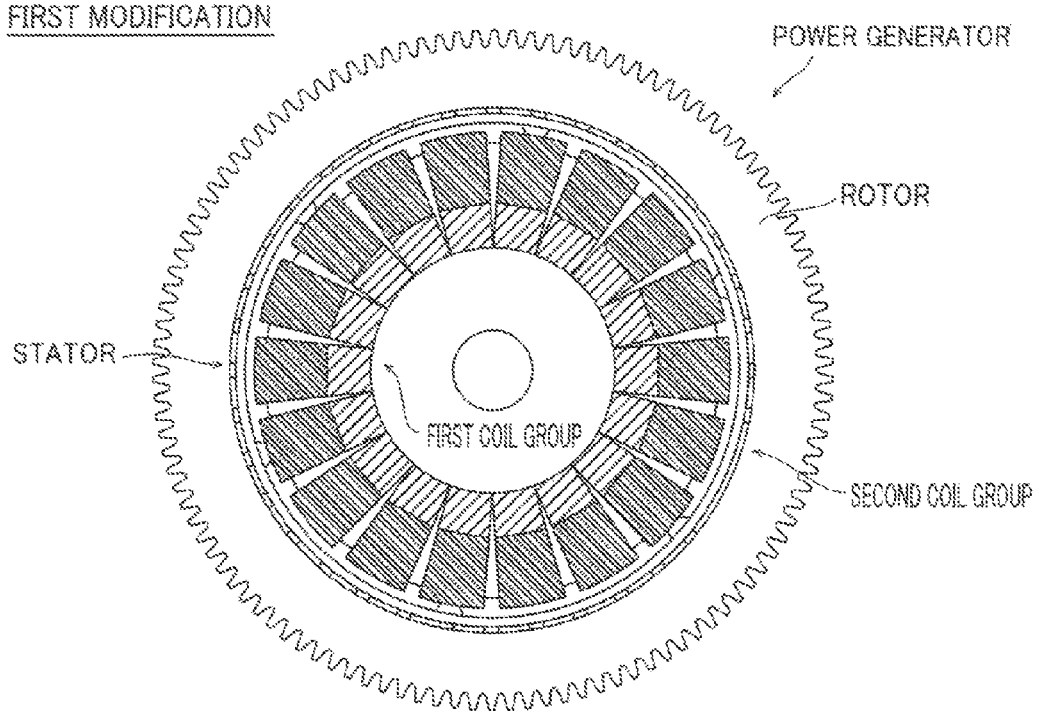
FIG. 9 illustrates arrangements of coil groups of a power generator of a boat according to a first modification of the embodiment of the present invention.

While the windings of the first coil group and the windings of the second coil group are wound on the slots different from each other in the aforementioned embodiment, the present invention is not restricted to this. According to the present invention, the windings of the first coil group and the windings of the second coil group may alternatively be wound on common slots, as in a first modification shown in FIG. 9.

Figure 10:
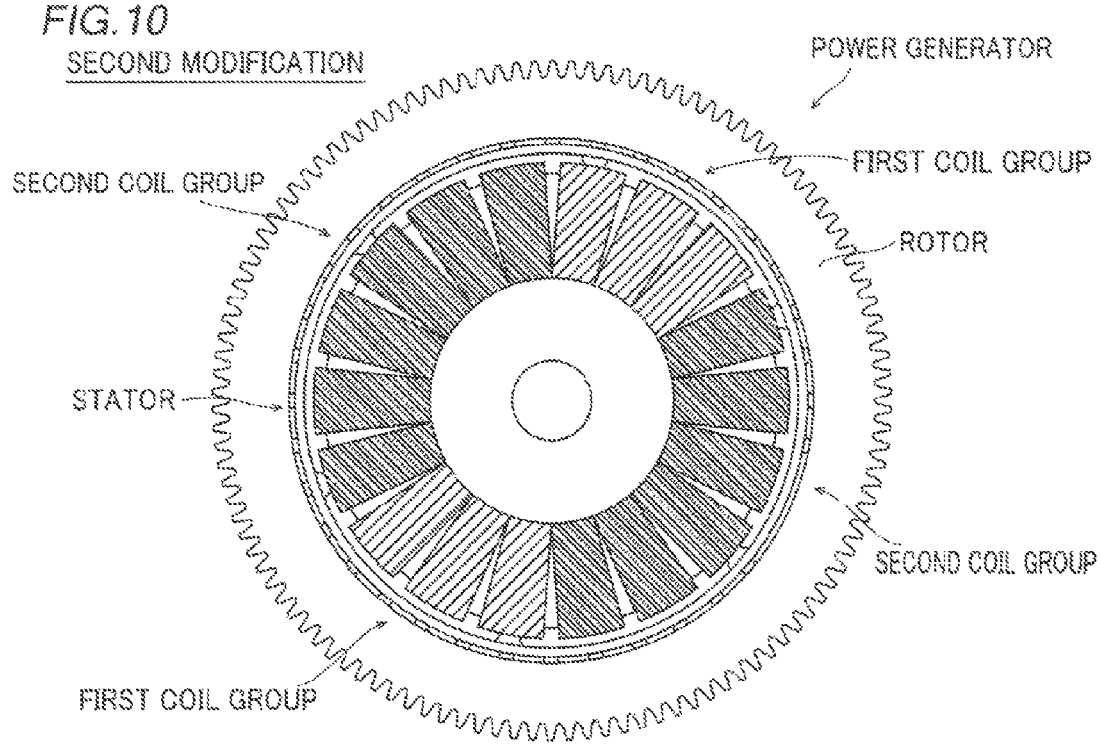
FIG. 10 illustrates arrangements of coil groups of a power generator of a boat according to a second modification of the embodiment of the present invention.

While the windings of the first coil group are adjacently wound on the six slots and the windings of the second coil group are adjacently wound on the twelve slots, as shown in FIG. 3 in the aforementioned embodiment, the present invention is not restricted to this. According to the present invention, the slots on which the windings of the first coil group are wound and the slots on which the windings of the second coil group are wound may alternatively be dispersed. As in a second modification shown in FIG. 10, for example, three slots on which the windings of the first coil group are wound may be successively arranged, six slots on which the windings of the second coil group are wound may be successively arranged, three slots on which the windings of the first coil group are wound may be successively arranged again, and six slots on which the windings of the second coil group are wound may be successively arranged again.

While the windings of the first coil group are wound on the six slots and the windings of the second coil group are wound on the twelve slots in the aforementioned embodiment, the present invention is not restricted to this. According to the present invention, the windings of the first coil group may alternatively be wound on a number of slots other than six, and the windings of the second coil group may alternatively be wound on a number of slots other than twelve.

While the rectifier (rectifier/regulator), the converting device (converter), and the transformation mechanism (DC-DC transformer) are fixed to the engine in the aforementioned embodiment, the present invention is not restricted to this. According to the present invention, it is only required to fix at least one of the rectifier, the converting device, and the transformation mechanism to the engine.

While the rotor (power generator) is arranged above the engine on the axis of the crankshaft in the aforementioned embodiment, the present invention is not restricted to this. According to the present invention, the rotor (power generator) may alternatively be arranged below the engine on the axis of the crankshaft. Furthermore, the rotor may alternatively be arranged away from the crankshaft, and the power of the crankshaft may alternatively be transmitted to the rotor through a drive belt, a chain, a gear, or the like.

While the engine battery is connected to the first coil group and the boat accessory battery is connected to the second coil group in the aforementioned embodiment, the present invention is not restricted to this. According to the present invention, the boat accessory battery may alternatively be connected to the first coil group, and the engine battery may alternatively be connected to the second coil group.

While one outboard motor is provided in the boat body in the aforementioned embodiment, the present invention is not restricted to this. According to the present invention, a plurality of outboard motors may alternatively be provided in a boat body. In this case, an engine battery may be provided for each of the plurality of outboard motors.

What is claimed is:

1. A marine propulsion device, comprising:
   an engine including a crankshaft;
   a power generator including
      a rotor configured to be rotated by the crankshaft, and
      a stator arranged to face the rotor, the stator including a first coil group and a second coil group each configured to generate alternating current (AC), the second coil group being configured to generate more electric power than the first coil group;
   a rectifier configured to rectify the AC generated by the first coil group to thereby obtain a first direct current (DC), and to output the first DC to a first battery;
   a converting device configured to convert the AC generated by the second coil group into a second DC; and
   a transformation device configured to transform a voltage of the second DC converted by the converting device, and to output the voltage-transformed DC to a second battery.

2. The marine propulsion device according to claim 1, wherein
   each of the first and second coil groups includes a plurality of windings; and
   the windings of the second coil group have cross-sectional areas equal to or greater than cross-sectional areas of the windings of the first coil group.

3. The marine propulsion device according to claim 2, wherein the stator includes a plurality of first slots on which the windings of the first coil group are wound, and a plurality of second slots on which the windings of the second coil group are wound, and a number of winds per slot of the second coil group is not more than a number of winds per slot of the first coil group.

4. The marine propulsion device according to claim 2, wherein the stator includes a plurality of first stacked magnetic steel sheets and a plurality of second stacked magnetic steel sheets, on which the first and second coil groups are respectively wound, and a stack thickness of the first stacked magnetic steel sheets is not more than a stack thickness of the second stacked magnetic steel sheets.

5. The marine propulsion device according to claim 1, wherein the stator includes a plurality of first slots and a plurality of second slots, on which windings of the first coil group and windings of the second coil group are respectively wound, the second slots being different from the first slots, a number of the second slots being equal to or more than a number of the first slots.

6. The marine propulsion device according to claim 1, wherein the stator includes a plurality of slots on which windings of the first and second coil groups are wound, and windings of the first coil group are wound on at least one of the slots on which windings of the second coil group also are wound.

7. The marine propulsion device according to claim 1, wherein the electric power generated by the second coil group is equal to, or more than twice of, the electric power generated by the first coil group.

8. The marine propulsion device according to claim 1, wherein the electric power generated by the second coil group when the engine idles is equal to or more than the electric power generated by the first coil group when the engine operates at full throttle.

9. The marine propulsion device according to claim 1, further comprising a cowling, which covers the engine, and in which the rotor, the stator, the rectifier, the converting device and the transformation device are arranged.

10. The marine propulsion device according to claim 9, wherein at least one of the rectifier, the converting device, and the transformation device is fixed to the engine.

11. The marine propulsion device according to claim 9, wherein the rotor is provided integrally with a flywheel connected to the crankshaft.

12. The marine propulsion device according to claim 11, wherein the rotor is arranged above or below the engine on an axis of the crankshaft.

13. The marine propulsion device according to claim 1, wherein the converting device includes a switching element.

14. A boat, comprising:
a boat body;
a first battery and a second battery both arranged in the boat body; and
a marine propulsion device mountable on the boat body, the marine propulsion device including
an engine including a crankshaft,
power generator including
a rotor configured to be rotated by the crankshaft, and
a stator arranged to face the rotor, the stator including a first coil group and a second coil group each configured to generate alternating current (AC), the second coil group being configured to generate more electric power than the first coil group,
a rectifier configured to rectify the AC generated by the first coil group to thereby obtain a first direct current (DC), and to output the first DC to the first battery,
a converting device configured to convert the AC generated by the second coil group into a second DC, and
a transformation device configured to transform a voltage of the second DC converted by the converting device, and to output the voltage-transformed DC to the second battery.

15. The boat according to claim 14, further comprising:
an electrical component arranged in the boat body; and
an engine accessory configured to drive the engine of the marine propulsion device, wherein
the first battery is configured to supply electric power to the engine accessory, and
the second battery is configured to supply electric power to the electrical component.

16. The boat according to claim 14, wherein the converting device includes a switching element.

* * * * *